United States Patent [19]

Shintani et al.

[11] 4,013,981

[45] Mar. 22, 1977

[54] CONSTANT-RESISTANCE COUPLED-LINE TYPE EQUALIZER

[75] Inventors: Sotokichi Shintani, Mitaka; Michitoshi Tamori, Tanashi; Nobuo Nagai, Sapporo, all of Japan

[73] Assignee: Kokusai Denshin Denwa Kabushiki Kaisha, Tokyo, Japan

[22] Filed: June 19, 1975

[21] Appl. No.: 588,221

[30] Foreign Application Priority Data

June 29, 1974 Japan .............................. 49-74488

[52] U.S. Cl. .............................. 333/28 R; 333/10
[51] Int. Cl.$^2$ ........................................ H03H 7/14
[58] Field of Search ........................... 333/10, 28 R

[56] References Cited

UNITED STATES PATENTS

| | | | |
|---|---|---|---|
| 3,372,350 | 3/1968 | Yawahashi et al. | 333/28 |
| 3,382,465 | 5/1968 | Robbins | 333/28 |
| 3,600,707 | 8/1971 | Friedman | 333/10 |
| 3,899,756 | 8/1975 | Bodongi | 333/10 |

*Primary Examiner*—Paul L. Gensler
*Attorney, Agent, or Firm*—Armstrong, Nikaido & Wegner

[57] ABSTRACT

An equalizer having improved amplitude characteristics and phase characteristics of more than several hundred MHz has been found by using a four port directional coupler. The equalizer consists of coupled lines, and two far end ports of the directional coupler are grounded through two resistances $R_1$, respectively; while interconnecting the two far end ports through a resistance $r$, an input port is formed at one of the near end ports of the directional coupler, and an output port is formed at the other end thereof, said resistances substantially satisfying the relation of $$G_1(G_1+2g)=G_0^2 \qquad Z_{oo} Z_{oe}=R_0^2$$

where, $G_1=1/R_1, g=1/r, G_0=1/R_0$, $R_0$ being resistance of a power source and a load, $Z_{oo}$ being the odd mode impedance of a coupled line, and $Z_{oe}$ being the even mode impedance of the same.

5 Claims, 29 Drawing Figures

Fig.1 PRIOR ART
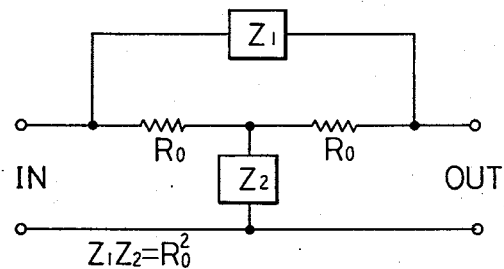
Fig.2(A)   Fig.2(B)
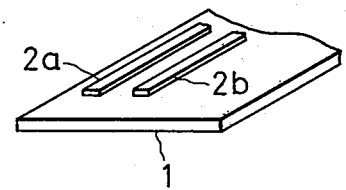 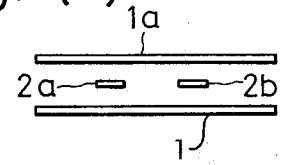
Fig.3(A)
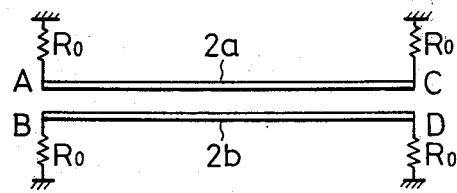
Fig.3(B)
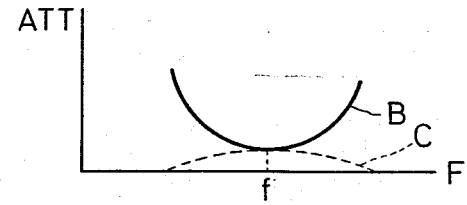

Fig. 11
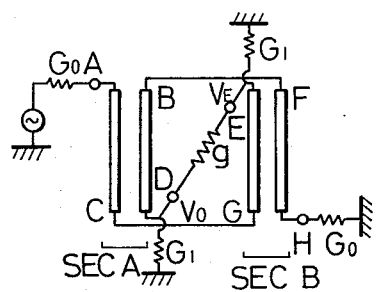
Fig.12(A)   Fig.12(B)
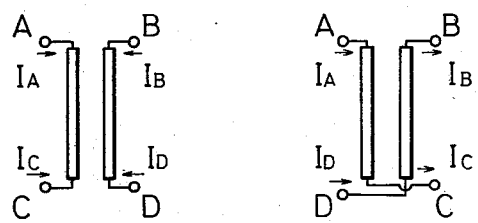
Fig.12(C)   Fig.(D)
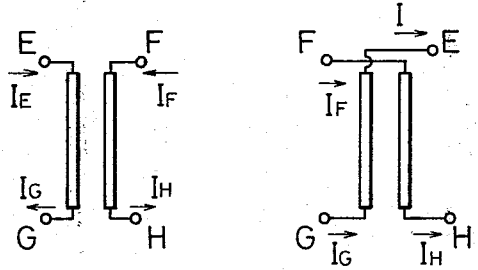
Fig.12(E)
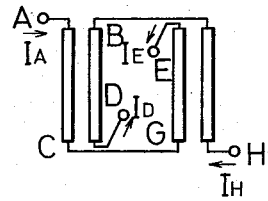

CONSTANT-RESISTANCE COUPLED-LINE TYPE EQUALIZER

BACKGROUND OF THE INVENTION

This invention generally relates to an equalizer for equalizing the amplitude frequency characteristics of a transmission system, and more particularly to an equalizer having excellent amplitude and phase characteristics for high frequency bands in excess of several hundred MHz, which characteristics at such high frequency have not been obtained by concentrated constant circuit elements.

It has been known that, in a long-distance coaxial transmission line, the line loss generally increases with frequency. Thus, equalizers are inserted into suitable portions of such a transmission line for flattening the amplitude-frequency characteristics thereof, and it is desirable to make the equalizer controllable.

A typical equalizer of conventional construction is shown in FIG. 1. As illustrated in the figure, the equalizer is formed of a bridged constant resistance bridged-T-type circuit, and constituent elements $Z_1$ and $Z_2$ are formed of concentrated circuit constants or distributed circuit constants, depending on the frequency bands wherein they are used.

If the elements $Z_1$ and $Z_2$ are distributed constant circuits, the equalizer can be used in high frequency bands, but the element $Z_1$ should have a construction of a dual coaxial line since it floats with respect to the ground. See "A constant resistance bridged-T equalizer using transmission-line element" by Raymond A Thatch IEEE Transactions on circuit theory, September 1973 pp 577–580.) Accordingly, the frequency range wherein such an equalizer can be used is restricted to several hundred MHz at most.

SUMMARY OF THE INVENTION

Therefore, the present invention mitigates the aforesaid difficulty of the conventional equalizer, by providing a novel equalizer of constant resistance type without using any dual coaxial line elements. An object of the present invention is to provide an equalizer having excellent amplitude and phase characteristics in several thousand MHz frequency bands, which equalizer can be advantageously used in building-up network and communication systems, such as high-speed pulse code modulated (PCM) communication systems and coaxial transmission systems.

To fulfill the aforesaid objects, an equalizer according to the present invention is characterized by a construction which is based on a four port directional coupler using micro strip coupling lines, far end pair ports of the directional coupler being terminated with resistances, another resistance being connected between said terminal resistances, which other resistance has a certain relation with said terminal resistances.

Another characteristic of the equalizer according to the present invention is a construction in which said four port directional coupler is formed into a two port circuit by forming an absorbing conductance through two of the four ports while using the remaining two ports as transmission ports, and the two port circuit is suitably combined with the aforesaid resistance in a specified manner.

A further characteristic of the present invention is in a circuit construction wherein a plurality of stages of said directional couplers are connected while connecting one equalizer according to the present invention to the last stage thereof, in such a manner that the overall circuit has a constant-resistance.

BRIEF DESCRIPTION OF THE DRAWINGS

The foregoing and other objects, features, and attendant advantages of the invention will be appreciated as the same become better understood from the description of the preferred embodiments with reference to the accompanying drawings wherein:

FIG. 1 is a schematic structural diagram of a conventional equalizer;

FIGS. 2A and 2B are diagramatic illustrations of the structure of coupling lines;

FIGS. 3A and 3B are a schematic structural diagram and a characteristic curve of a directional coupler;

FIG. 11 shows a structure of another embodiment of the present invention;

FIG. 12(A) through FIG. 12(E) are partial elements of the equalizer in FIG. 11;

DETAILED DESCRIPTION OF THE PREFERRED EMBODIMENTS

An example of micro strip coupling line construction is shown in FIG. 2A. In the figure, a grounded conductor 1 carries a pair of parallel line conductors $2a$ and $2b$ disposed thereon, and suitable dielectric material fills up the space between the two line conductors. Alternately, a pair of grounded conductors 1 and $1a$ may be used in the construction, as shown in FIG. 2B.

Referring to FIG. 3A, it is known that if the lengths of the line conductors as shown in FIG. 2A or 2B, are selected to be a quarter of a wavelength, while terminating the four ports A, B, C, and D with resistances $R_0$, respectively, and if a certain relation is established between the two line conductors, then a directional coupler is formed. For simplicity, the grounded conductors are not shown in FIG. 3A and in the succeeding figures. Referring to FIG. 3A, the directional coupler means a constant impedance circuit elements, wherein, when an input signal is applied to the port A, an amplitude characteristics as shown by the curve B of FIG. 3B is obtained at the terminal B, and another amplitude characteristic as shown by the curve C of FIG. 3C is obtained at the port C, while no output signals are produced at the terminal D over the entire frequency bands. In the graph of FIG. 3B, the abscissa represents frequency F and the ordinate represents attenuation ATT in dB, and the magnitude of the attenuation at the middle frequency $f$ is determined by the degree of coupling between the two line conductors.

For details of the directional coupler, refer to "The Analytical Equivalence of TEM mode Directional Coupler and Transmission Line Stepped-impedance Filters", Proceedings IEEE volume 110, number 2 (February, 1963), pages 275–281. As regards the multistage coupling type directional coupler, refer to "Design and Data of Two- or Three-elements Coupled-transmission-line directional couplers", The Journal of the Institute of Television Engineers of Japan, Volume 27, Number 10 (1973), pages 38–46.

With the present invention, the aforesaid four port directional coupler is used as a two port circuit, and a further expedient is used for producing an equalizer with constant-resistance characteristics.

Figure 4A:
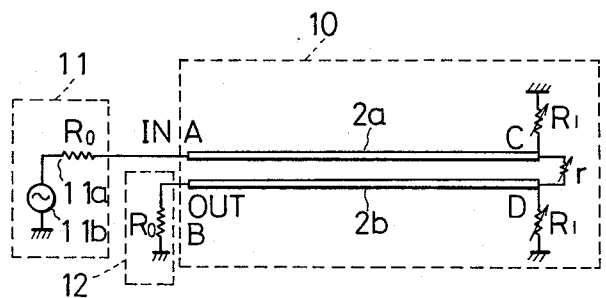
FIGS. 4A, 4B and 4C are a schematic structural diagram of an equalizer according to the present invention and characteristic curves thereof.

FIG. 4A shows construction of a first embodiment of the present invention. In the figure, reference numeral 10 represents an equalizer, in which far end terminals C and D of coupling strip lines 2a and 2b are terminated by resistances $R_1$, respectively. Another resistance $r$ is connected between the terminals C and D. In this case the strip lines 2a and 2b are supposed to satisfy the condition of the directional coupled line;

$$Z_{oo} Z_{oe} = R_0^2$$

where $Z_{oo}$ is the odd mode impedance of the strip line, $Z_{oe}$ is the even mode impedance of the strip line, and $R_0$ is the resistance of a power source and a load.

A power source 11 (having an internal resistor 11a with a resistance value $R_0$ and an A.C. source 11b) is connected to one near end terminal A, while the other near end terminal B is terminated through a load 12 (consisting of a resistor having a resistance value $R_0$). Different amplitude characteristics across the terminals A and B can be obtained by varying the resistance $r$.

Figure 4B:
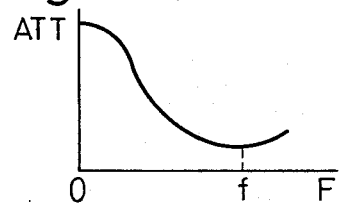
Figure 4C:
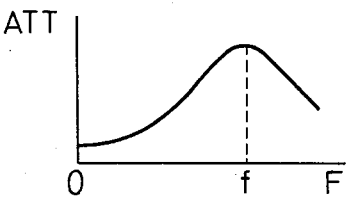

FIGS. 4B and 4C illustrate the amplitude characteristics for the case of $r > R_0$ and for the case of $r < R_0$, respectively. The abscissa and the ordinate represent the frequency F and the attenuation ATT in dB, respectively.

The input impedance of the equalizer 10, as seen from the near end terminals A and B, becomes constant under the following conditions.

$$G_1(G_1 + 2g) = G_0^2 \quad \text{or} \quad R_1 = R_0 \frac{R_0 + \sqrt{R_0^2 + r^2}}{r} \quad (1)$$

Here, $G_1 = 1/R_1, g = 1/r, G_0 = 1/R_0$.

Therefore, if the equalizer 10 is designed to use the resistances $R_1$ and $r$ satisfying the equation (1), the amplitude characteristics of FIG. 4B or FIG. 4C can be achieved.

It was confirmed by computer calculation that, even if the resistance values $R_1$ and $r$ deviate from the conditions of the equation (1), the deviation of the impedance of the equalizer is small. Thus, there is no need for strict adjustment of the resistances $R_1$ and $r$. The mathematical derivation of the equation (1) will be described hereinafter.

When the resistance $r$ is inserted between the near end terminals A and B, instead of between the far end terminals C and D, a characteristic similar to that shown in FIG. 4B may be achieved provided that $r > R_0$, but if the condition of $r > R_0$ is not satisfied, the input impedance becomes non-constant so that this is not suitable for the equalizer.

Figure 5A:
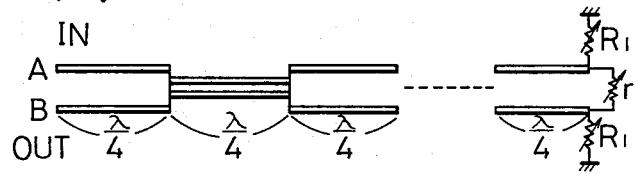
FIGS. 5A, 5B, and 5C are a schematic structural diagram of another equalizer according to the present invention and characteristic curves thereof.
Figure 5B:
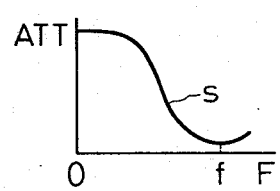
Figure 5C:
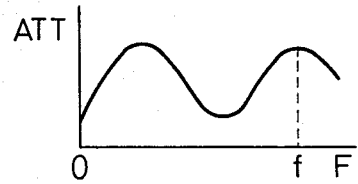

FIG. 5A illustrates construction of a second embodiment of the equalizer according to the present invention. In this embodiment, a plurality of directional couplers, each of which has an identical length of a quater wavelength ($\lambda/4$) but different characteristics, are concatenated, and the last section coupler is terminated with resistances $R_1$ and $r$ satisfying the conditions of the equation (1), as in the case of FIG. 4A. With this construction, if the near end terminals A and B are used as an input port and an output port, respectively, the characteristics as shown in FIG. 5B can be achieved, provided that $r > R_0$. In this case, the slope of the decreasing portion $s$ in the attenuation curve of FIG. 5B is steeper than the corresponding slope of FIG. 4B. Furthermore, if $r < R_0$, there will be provided a ridge-like characteristic including one peak and one valley attenuation between DC and the mid-band frequency $f$, as shown in FIG. 5C.

Figure 6:
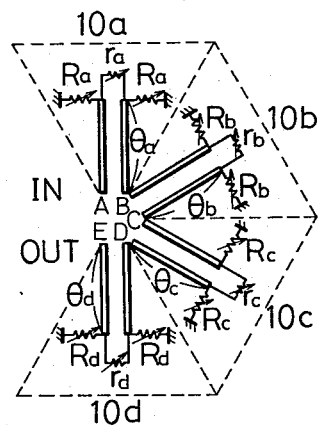
FIG. 6 is a schematic structural diagram of a further embodiment of the present invention.

FIG. 6 illustrates the construction of a third embodiment of the equalizer according to the present invention. In this embodiment, a plurality of equalizer units, each of which is similar to the first embodiment, as shown in FIG. 4A, are concatenated. More particularly, the output B of a first equalizer unit 10a having an input terminal A is connected to the input of a second equalizer unit 10b, the output C from the second coupler 10b is connected to the input of a third coupler unit 10c, and the output D from the third equalizer unit 10c is connected to the input of the fourth equalizer unit 10c having an output terminal E. Thus, the input port and the output port of the overall equalizer including the aforesaid equalizer units become the terminals A and E, respectively. With the multi-stage equalizer, as shown in FIG. 6, different attenuating and equalizing characteristics can be achieved by varying the electric lengths $\theta$ of the coupling line of each equalizer unit. It should be noted that the number of equalizer units to be concatenated in the multi-stage equalizer is not restricted to four, but any number of stages can be used in the equalizer according to the present invention.

Figure 7A:
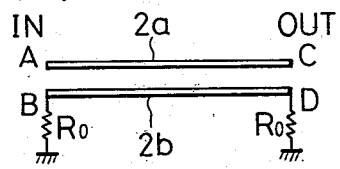
FIGS. 7A and 7B are a schematic structural diagram of an embodiment using a directional coupler as a two port means and a characteristics curve thereof.
Figure 7B:
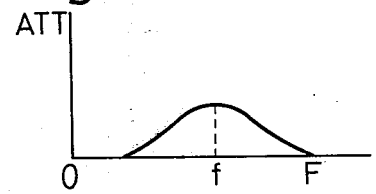

FIG. 7A illustrates a constant-resistance fixed equalizer using a four port directional coupler, in which only two ports, i.e., ports A and C, are used for producing an amplitude characteristics, as shown in FIG. 7B.

Figure 8A:
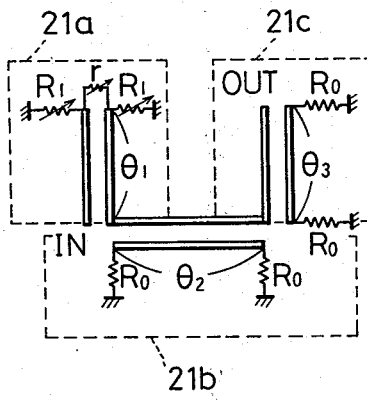
FIGS. 8A and 8B are schematic structural diagram of different equalizers according to the present invention.
Figure 8B:
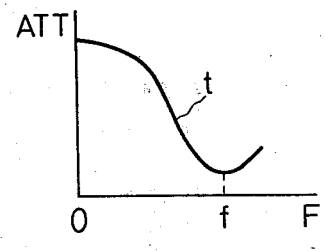

FIG. 8A illustrates the construction of another embodiment of an equalizer according to the present invention. In this embodiment, fixed equalizer units 21b and 21c, having the construction as shown in FIG. 7A and amplitude characteristics as shown in FIG. 7B, are concatenated to a variable equalizer unit 21a having construction as shown in FIG. 4A. With the circuit construction of FIG. 8A, if the condition of $r > R_0$ is satisfied, the amplitude characteristics of FIG. 8B can be achieved, wherein the magnitude and shape of the slope $t$ of the attenuation curve can be finely controlled, which fine control of the characteristics curve cannot be achieved by simple adjustment of the resistances $R_1$ and $r$.

Figure 9A:
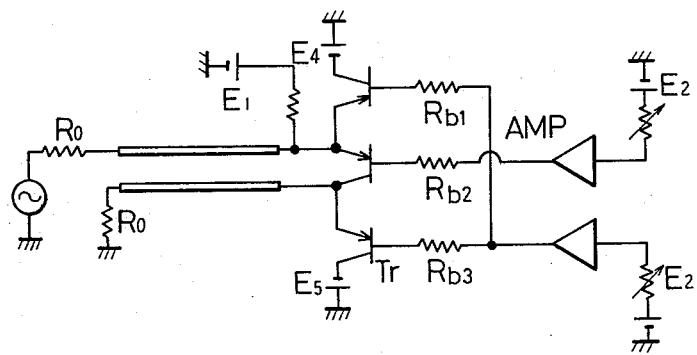
FIGS. 9A and 9B are schematic structural diagrams of equalizers according to the present invention including active circuit elements.
Figure 9B:
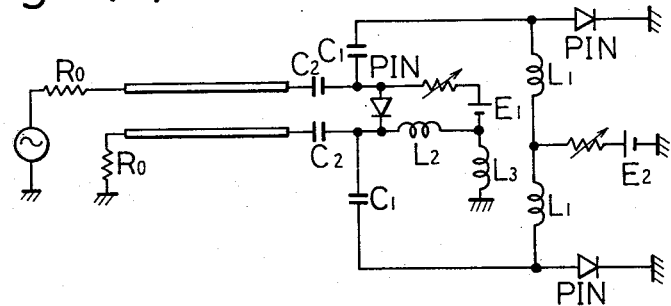

FIGS. 9A and 9B illustrate different embodiments, wherein active elements are used which act as resistance $r$ and $R_1$ in high frequency bands. The embodiment of FIG. 9A uses high frequency transistors, while the embodiment of FIG. 9B uses PIN diodes. Since such circuits can be easily understood by those skilled in the art, the details thereof will not be described here.

(Refer, for instance, to the book, "Micro Wave Semiconductor Devices and Their Circuit Applications", written by H. A. Watson and Published by McGraw-Hill.)

With the preceding embodiments, the operation characteristics of the equalizer can be determined by computer calculation based on the construction of the coupled lines and the resistance values $R_1$ and $r$, whereby an equalizer satisfying the required characteristics of a system being equalized can be selected. Furthermore, if the resistances $R_1$ and $r$ are made variable, the condition of the equation (1) can be met by adjusting the variable resistances.

As described in the foregoing disclosure, with the present invention, a constant resistance equalizer which is particularly suitable for use in high frequency bands can be provided.

Figure 10:
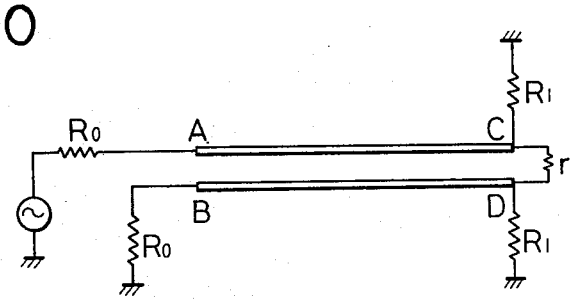
FIGS. 10 is a diagram to be used in deriving equations for describing the present invention.

Finally, the mathematical derivation of the equation (1) will be described. The characteristic admittance matrix $[\eta]$ of a symmetrical coupled line, as shown in FIG. 10, can be set as in the following equation (2). Then, the F-matrix for the case neglecting the resistances connected to far end terminals of FIG. 10 will become as in the following equation (3).

$$[\eta] = \begin{bmatrix} \eta_{11} & -\eta_{12} \\ -\eta_{12} & \eta_{11} \end{bmatrix} \quad (2)$$

$$\begin{bmatrix} V_A \\ V_B \\ I_A \\ I_B \end{bmatrix} = \begin{bmatrix} C & 0 & S\xi_{11} & S\xi_{12} \\ 0 & C & S\xi_{12} & S\xi_{11} \\ S\eta_{11} & -S\eta_{12} & C & 0 \\ -S\eta_{12} & S\eta_{11} & 0 & C \end{bmatrix} \begin{bmatrix} V_C \\ V_D \\ I_C \\ I_D \end{bmatrix} \quad (3)$$

$C = \cos\eta\gamma\, l,\; S = \sin\eta\,\gamma\, l$ $\zeta_{11} = \dfrac{\eta_{11}}{\eta_{11}^2 - \eta_{12}^2},\; \zeta_{12} = \dfrac{\eta_{12}}{\eta_{11}^2 - \eta_{12}^2}$ Propagation
$\gamma$ : constant   $l$ : Line length $G_1 = \dfrac{1}{R_1},\; g = \dfrac{1}{\gamma},\; G_0 = \dfrac{1}{R_0}$  (4)

Then, if quantities $G_1$, $g$, and $G_0$ are set as defined in the equation (4), the relation of the equation (5) will result.

$$I_B = -G_0 V_B$$

$$\begin{bmatrix} I_C \\ I_D \end{bmatrix} = \begin{bmatrix} G_1+g & -g \\ -g & G_1+g \end{bmatrix} \begin{bmatrix} V_C \\ V_D \end{bmatrix} \quad (5)$$

In order to convert a four port circuit into a two port circuit by using the condition of the equation (5), the equation (5) is substituted into the equation (3).

$$V_A = \{C + S\zeta_{11}(G_1+g) - S\zeta_{12}g\}V_C + \{S\zeta_{12}(G_1+g) - S\zeta_{11}g\}V_D \quad (6)$$

$$V_B = \{S\zeta_{12}(G_1+g) - S\zeta_{11}g\}V_C + \{C + S\zeta_{11}(G_1+g) - S\zeta_{12}g\}V_D \quad (7)$$

$$I_A = \{C(G_1+g) + S\eta_{11}\}V_C - (Cg + S\eta_{12})V_D \quad (8)$$

$$-G_0 V_B = -(Cg + S\eta_{12})V_C + \{C(G_1+g) + S\eta_{11}\}V_D \quad (9)$$

Solving the equations (7) and (9) for $V_C$ by eliminating $V_B$ $$V_C = -\dfrac{G_0\left\{C + S\zeta_{11}(G_1+g) - S\zeta_{12}g\right\} + \left\{C(G_1+g) + S\eta_{11}\right\}}{G_0\left\{S\zeta_{12}(G_1+g) - S\zeta_{11}g\right\} - (Cg + S\eta_{12})} \quad (10)$$

From the equations (6) and (8), $$\dfrac{I_A}{V_A} = \dfrac{\left\{C(G_1+g) + S\eta_{11}\right\}V_C - (Cg + S\eta_{12})V_D}{C + \left\{S\zeta_{11}(G_1+g) - S\zeta_{12}g\right\}V_C + \left\{S\zeta_{12}(G_1+g) - S\zeta_{11}g\right\}V_D} \quad (11)$$

After substituting the equation (10) into the equation (11), the numerator and the denominator of the equation (11) become as shown by the following formulae (12) and (13). By simplifying the expressions with the notation of the equations (14) to (16), and by assuming the conditions of the equations (17) and (18), the simple relation of the equation (19) is derived.

$$-C^2 G_1 (G_1 + 2g) + 2SC \left\{ \eta_{12}g - \eta_{11}(G_1 + g) \right\} - S^2 (\eta_{11}^2 - \eta_{12}^2)$$

$$\frac{-G_0}{\eta_{11}^2 - \eta_{12}^2} \left[ C^2 (G_1 + g)(\eta_{11}^2 - \eta_{12}^2) + SC \left\{ \eta_{11}(\eta_{11}^2 - \eta_{12}^2) + \eta_{11}G_1(G_1 + 2g) \right\} + S^2 \left\{ (G_1 + g)(\eta_{11}^2 + \eta_{12}^2) - 2\eta_{11}\eta_{12}g \right\} \right] \quad (12)$$

$$\frac{G_0}{\eta_{11}^2 - \eta_{12}^2} \left[ -C^2 (\eta_{11}^2 - \eta_{12}^2) + 2SC \left\{ \eta_{12}g - \eta_{11}(G_1 + g) \right\} - S^2 G_1 (G_1 + 2g) \right] \quad (13)$$

$$-\frac{1}{\eta_{11}^2 - \eta_{12}^2} \left[ C^2 (G_1 + g)(\eta_{11}^2 - \eta_{12}^2) + SC \left\{ \eta_{11}(\eta_{11}^2 - \eta_{12}^2) + \eta_{11}G_1(G_1 + 2g) \right\} + S^2 \left\{ (G_1 + g)(\eta_{11}^2 + \eta_{12}^2) - 2\eta_{11}\eta_{12}g \right\} \right]$$

$$P = -C^2 G_1 (G_1 + 2g) + 2SC \{\eta_{12}g - \eta_{11}(G_1 + g)\} - S^2 (\eta_{11}^2 - \eta_{12}^2) \quad (14)$$

$$q = -C^2 (\eta_{11}^2 - \eta_{12}^2) + 2SC\{\eta_{12}g - \eta_{11}(G_1 + g)\} - S^2 G_1 (G_1 + 2g) \quad (15)$$

$$t = C^2 (G_1 + g)(\eta_{11}^2 - \eta_{12}^2) + \eta_{11}G_1(G_1 + 2g)\} + S^2\{(G_1 + g)(\eta_{11}^2 - \eta_{12}^2) + SC\{\eta_{11}(\eta_{11}^2 + \eta_{12}^2) - 2\eta_{11}\eta_{12}g\}\} \quad (16)$$

$$\frac{I_A}{V_A} = \frac{P(\eta_{11}^2 - \eta_{12}^2) - G_0 t}{G_0 q - t} = G_0 \cdot \frac{\frac{\eta_{11}^2 - \eta_{12}^2}{G_0} P - t}{G_0 q - t} \quad (17)$$

$$G_1 (G_1 + 2g) = \eta_{11}^2 - \eta_{12}^2 = G_0^2 \quad (18)$$

$$\frac{I_A}{V_A} = G_0 \quad (19)$$

The equation (19) indicates that the circuit of FIG. 10 is a constant-resistance circuit.

By substituting the relation of $R_1 = 1/G_1$, $r = 1/g$, and $R_0 = 1/G_0$ into the equation of $G_1(G_1 + 2g) = G_0^2$, the following relation can be achieved $$R_1 = R_0 \cdot \left( \frac{R_0 + \sqrt{R_0^2 + r^2}}{r} \right)$$

The relation of $\eta_{11}^2 - \eta_{12}^2 = G_0^2$ in the foregoing equation (18) indicates the aforesaid "certain relation" for establishing the direction coupler, as described hereinbefore by referring to FIG. 3A.

Next, another embodiment of the present invention will be explained with reference to FIG. 11 through FIG. 14.

FIG. 11 shows the structure of the equalizer according to the present invention. In FIG. 11, two pairs of strip-lines SEC A and SEC B are provided, and each of the strip lines have input and/or output terminals A, B, C, D, E, F, G and H, as shown in FIG. 11. The terminal A of the first strip line SEC A is an input terminal of the equalizer and is connected to the input source through the input resistor $G_0$. The terminal B is connected to the terminal F of the second strip line SEC B, and the terminal C is connected to the terminal G. The terminal D of the first strip line SEC A and the terminal E of the second strip line SEC B are connected through the admittance $g$, and the terminals D and E are grounded through the admittance $G_1$. The terminal H of the second strip line SEC B is an output terminal of the equalizer and is connected to a load having the admittance $G_0$.

The derivation of equations expressing the input impedance and the attenuation characteristics of the circuit of FIG. 11 will now be described, together numerical values thereof as determined by computer calculation. To make the ciruit of FIG. 11 a constant resistance circuit, the following conditions must be satisfied.

$$\left. \begin{array}{l} Z_{oe}^{(A)} \cdot Z_{oo}^{(A)} = R_0^2 \\ Z_{oe}^{(B)} \cdot Z_{oo}^{(B)} = R_0^2 \\ G_1 (G_1 + 2g) = G_0^2 \\ G_0 = 1/R_0, \, G_1 = 1/R_1, \, g = 1/r \end{array} \right\} \quad (21)$$

where $Z_{oe}^{(A)}$ is the even mode impedance of the strip line SEC A. $Z_{oo}^{(A)}$ is the odd mode impedance of the same, $Z_{oe}^{(B)}$ is the even mode impedance of the strip line of SEC B, $Z_{oo}^{(B)}$ is the odd mode impedance of the same, $R_0$ is the resistance of the power source and the load, $G_1$ is the admittance between D or E and the ground, and $g$ is the admittance between D and E.

The left-hand half of the circuit of FIG. 11 is equivalent to a circuit as shown in FIG. 12(A), and the F-matrix of the circuit of FIG. 12(A) is defined by the following equation (22). If the ports C and D of the circuit of FIG. 12(A) are switched, as shown in FIG. 12(B), the F-matrix can be modified into the following equation (23).

$$\begin{bmatrix} V_A \\ V_B \\ I_A \\ I_B \end{bmatrix} = [A_{ij}] \begin{bmatrix} V_C \\ V_D \\ I_C \\ I_D \end{bmatrix}, \quad [A_{ij}] = \begin{bmatrix} A_{11} & 0 & A_{13} & A_{14} \\ 0 & A_{11} & A_{14} & A_{13} \\ A_{31} & A_{32} & A_{11} & 0 \\ A_{32} & A_{31} & 0 & A_{11} \end{bmatrix} \quad (22)$$

here, $$A_{11} = \cos\theta$$

$$A_{13} = j\sin\theta \cdot \zeta_{11}^{(A)}$$

$$A_{14} = j\sin\theta \cdot \zeta_{12}^{(A)}$$

$$A_{31} = j\sin\theta \cdot \eta_{11}^{(A)}$$

$$A_{32} = j\sin\theta \cdot \eta_{12}^{(A)}$$

$$\eta_{11}^{(A)} = \frac{1}{2}\left(\frac{1}{Z_{oe}^{(A)}} + \frac{1}{Z_{oo}^{(A)}}\right)$$

$$\eta_{12}^{(A)} = \frac{1}{2}\left(\frac{1}{Z_{oe}^{(A)}} - \frac{1}{A_{oo}^{(A)}}\right)$$

$$\eta_{22}^{(A)} = \eta_{11}^{(A)}$$

$$[\zeta^{(A)}] = [\eta^{(A)}]^{-1}$$

$$[\eta^{(A)}] = \begin{bmatrix} \eta_{11}^{(A)} & -\eta_{12}^{(A)} \\ -\eta_{12}^{(A)} & \eta_{11}^{(A)} \end{bmatrix}$$

$$\begin{bmatrix} V_A \\ V_D \\ I_A \\ I_D \end{bmatrix} = [C_{ij}] \begin{bmatrix} V_B \\ V_C \\ I_B \\ I_C \end{bmatrix} \quad (23)$$

here, $$\delta_2 = A_{11}^2 - A_{13}A_{31}$$

$$C_{11} = -A_{14}A_{31}/\delta_2$$

$$C_{12} = A_{11} - A_{11}A_{14}A_{32}/\delta_2$$

$$C_{13} = -A_{11}A_{14}/\delta_2$$

$$C_{14} = A_{13} + A_{31}A_{14}^2/\delta_2$$

$$C_{21} = A_{11}/\delta_2$$

$$C_{22} = A_{13}A_{32}/\delta_2$$

$$C_{23} = A_{13}/\delta_2$$

$$C_{24} = C_{13}$$

$$C_{31} = A_{11}A_{32}/\delta_2$$

$$C_{32} = A_{31} + A_{13}A_{32}^2/\delta_2$$

$$C_{33} = C_{22}$$

$$C_{34} = C_{12}$$

$$C_{41} = A_{31}/\delta_2$$

$$C_{42} = C_{31}$$

$$C_{43} = C_{21}$$

$$C_{44} = C_{11}$$

Similarly, the equivalent circuit of the right-hand half of the circuit of FIG. 11 is as shown in FIG. 12(C), and switching of the ports E and F will result in a circuit as shown in FIG. 12(D). The F-matrices of the circuits of FIGS. 12(C) and 12(D) are given by the following equations (24) and (25), respectively.

$$\begin{bmatrix} V_E \\ V_F \\ I_E \\ I_F \end{bmatrix} = [b_{ij}] \begin{bmatrix} V_G \\ V_H \\ I_G \\ I_H \end{bmatrix} \quad (24)$$

$$\begin{bmatrix} V_F \\ V_G \\ I_F \\ I_G \end{bmatrix} = [e_{ij}] \begin{bmatrix} V_E \\ V_H \\ I_E \\ I_H \end{bmatrix} \quad (25)$$

The elements of the matrix $[b_{ij}]$ of the equation (24) can be derived by replacing the index (A) of the elements of the matrix $[a_{ij}]$ of the equation (22) with the index (B), while the elements of the matrix $[e_{ij}]$ of the equation (25) are identical with the corresponding elements of the matrix $[c_{ij}]$ of the equation (23) except that the elements $[a_{ij}]$ are replaced with the elements $[b_{ij}]$.

The terminals B and C of the circuit of FIG. 12(B) are connected to the terminals F and G of the circuit of FIG. 12(D), so as to form a circuit as shown in FIG. 12(E). Since there are relations of the equations (26) and (27), the F-matrix of the circuit of FIG. 12(E) is given by the following equation (28).

$$V_B = V_F \qquad I_B = I_F$$
$$V_C = V_G \qquad I_C = I_G \quad (26)$$

$$\left.\begin{array}{c}\begin{bmatrix} V_A \\ V_D \\ I_A \\ I_D \end{bmatrix} = [f_{ij}] \begin{bmatrix} V_E \\ V_H \\ I_E \\ I_H \end{bmatrix} \\ [f_{ij}] = [c_{ij}][e_{ij}] \end{array}\right\} \quad (27)$$

$$\begin{bmatrix} V_A \\ V_H \\ I_A \\ I_H \end{bmatrix} = [h_{ij}] \begin{bmatrix} V_E \\ V_D \\ I_E \\ I_D \end{bmatrix} \quad (28)$$

here, $$\delta_3 = f_{22}f_{44} - f_{24}f_{42}$$

$$h_{11} = f_{11} + f_{12} \cdot h_{21} - f_{14} \cdot h_{41}$$

$$h_{12} = f_{12} \cdot h_{22} - f_{14} \cdot h_{42}$$

$$h_{13} = f_{13} + f_{12} \cdot h_{23} - f_{14} \cdot h_{43}$$

$h_{14}=f_{12}\cdot h_{24}-f_{14}\cdot h_{44}$ $h_{21}=(f_{24}f_{41}-f_{44}f_{21})/\delta_4$ $h_{22}=f_{44}/\delta_4$ $h_{23}=(f_{24}f_{43}-f_{44}f_{23})/\delta_4$ $h_{24}=f_{24}/\delta_4$ $h_{31}=f_{31}+f_{32}\cdot h_{21}-f_{34}\cdot h_{41}$ $h_{32}=f_{32}\cdot h_{22}-f_{34}\cdot h_{42}$ $h_{33}=f_{33}+f_{32}\cdot h_{23}-f_{34}\cdot h_{43}$ $h_{34}=f_{32}\cdot h_{24}-f_{34}\cdot h_{44}$ $h_{41}=(f_{22}f_{41}-f_{42}f_{21})/\delta_4$ $h_{42}=f_{42}/\delta_4$ $h_{43}=(f_{22}f_{43}-f_{42}f_{23})/\delta_4$ $h_{44}=f_{22}/\delta_4$ The circuit of FIG. 11 can be constructed by connecting an admittance g to the circuit of FIG. 12(E). In this case, the terminal condition is given by the following equation (29).

$$\left.\begin{array}{l}\begin{bmatrix}I_D\\I_E\end{bmatrix}=\begin{bmatrix}G_1+g & -g\\-g & G_1+g\end{bmatrix}\begin{bmatrix}V_D\\V_E\end{bmatrix}\\ I_H=-G_0V_H\end{array}\right\} \quad (29)$$

Thus, the input admittance and the transfer function become as defined in the following equations (30) and (31).

$$\frac{I_A}{V_A}=\frac{-S_C(G_0S_F+S_H)+S_D(G_0S_E+S_G)}{-S_A(G_0S_F+S_H)+S_B(G_0S_E+S_G)} \quad (30)$$

here, $S_A=h_{11}+h_{13}(G_1+g)-h_{14}g$ $S_B=h_{12}-gh_{13}+h_{14}(G_1+g)$ $S_C=h_{31}+h_{33}(G_1+g)-h_{34}g$ $S_D=h_{32}-gh_{33}+h_{34}(G_1+g)$ $S_E=h_{21}+h_{23}(G_1+g)-h_{24}g$ $S_F=h_{22}-h_{23}g+h_{24}(G_1+g)$ $S_G=h_{41}+h_{43}(G_1+g)-h_{44}g$ $S_H=h_{42}-h_{43}g+h_{44}(G_1+g)$ $$\frac{V_H}{V_A}=\frac{S_ES_H-S_FS_G}{S_AS_H-S_BS_G+G_0(S_AS_F-S_BS_E)} \quad (31)$$

Figure 13A:
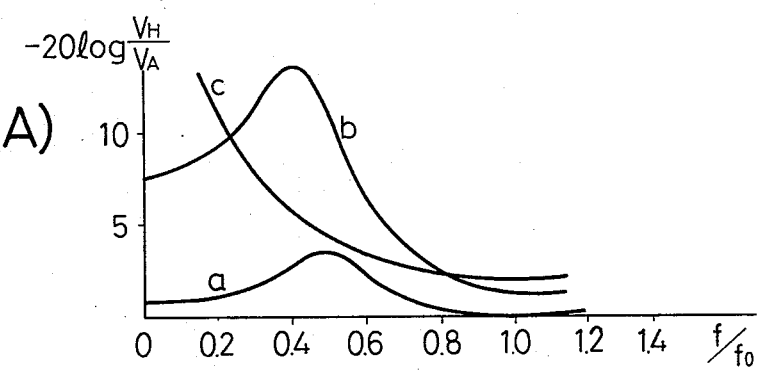
FIG. 13(A) through FIG. 13(C) are curves showing the characteristics of the equalizer in FIG. 11.
Figure 13B:
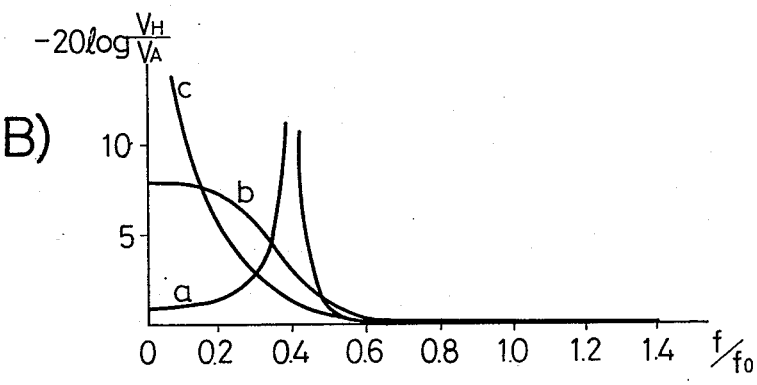
Figure 13C:
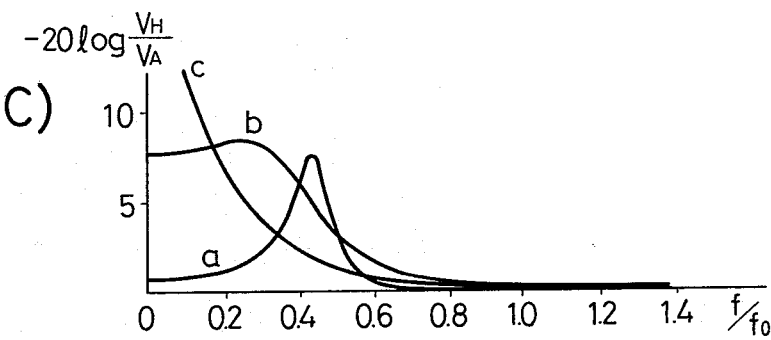

FIG. 13(A) through FIG. 13(C) show the curves of the attenuation characteristics of the equalizer shown in FIG. 11. These curves are computed by a digital computer with regard to the above equation (31). In these curves, the horizontal axis shows the normalized frequency $$\left(\frac{f}{f_0}\right)$$

where $f_0$ is the mid-band frequency, the vertical axis shows the attenuation $$\left(-20\log\frac{V_H}{V_A}\right).$$

and the parameter is a value of the resistance $\gamma$ or the admittance $g$ connected between the terminals D and E, where curve (a) is for $\gamma=5\,\Omega$, curve (b) is for $\gamma=50\Omega$ and curve (c) is for $\gamma=1000\Omega$ in each figure. The conditions of the mode impedance of each figure are listed below.

| | |
|---|---|
| FIG. 13 (A) | $Z_{er}^{(A)}=86.7$ |
| | $Z_{eo}^{(A)}=28.8$ |
| | $Z_{or}^{(B)}=75.4$ |
| | $Z_{oo}^{(B)}=33.2$ |
| FIG. 13 (B) | $Z_{er}^{(A)}=120.7$ |
| | $Z_{eo}^{(A)}=20.7$ |
| | $Z_{or}^{(B)}=120.7$ |
| | $Z_{oo}^{(B)}=20.7$ |
| FIG. 13 (C) | $Z_{er}^{(A)}=120.7$ |
| | $Z_{eo}^{(A)}=20.7$ |
| | $Z_{or}^{(B)}=86.7$ |
| | $Z_{oo}^{(B)}=28.8$ |

It should be noted that the above conditions satisfy the condition of the equation (21).

When the specification of an equalizer including attenuation characteristics is given, one of the curves can be selected from those in FIG. 13(A) through FIG. 13(C) and, thus, the desirable equalizer can be designed.

Figure 14:
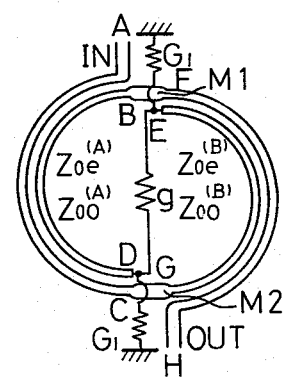
FIG. 14 is a modification of the equalizer in FIG. 11.

FIG. 14 is the modification of the structure in FIG. 11. In FIG. 14, two pairs of strip lines SEC A and SEC B are curved and form a pair of symmetrical half circles as shown in the figure, and between the terminals B and F, and C and G, there are provided matching elements M1 and M2, which have a width different from the other portion of the strip lines.

From the foregoing it will now be apparent that a new and improved equalizer has been found. It should be understood, of course, that the embodiments disclosed are only illustrative and are not intended to limit the scope of the invention. Reference should be made to the appended claims, therefore, rather than the specification as indicating the scope of the invention.

What is claimed is:

1. An equalizer including a four port directional coupler using strip coupling lines, characterized in that two far end ports of the directional coupler are grounded through two resistances $R_1$, respectively, while interconnecting the two far end ports through a resistance $r$, an input port is formed at one of the near end ports of the directional coupler, and an output port is formed at the other end thereof, wherein $$G_1(G_1+2g)=G_0^2$$

where, $G_1=1/R_1$, $g=1/r$, $G_0=1/R_0$, and $R_0$ is the resistance of a power source and a load.

2. An equalizer according to claim 1, wherein a plurality of said four port directional couplers are concatenated, the far end directional coupler of said plurality of directional couplers has said resistances $R_1$ and $r$ connected thereto, and overall input resistance of the coupled-line type network thus formed is constant, whereby, said equalizer is made variable.

3. An equalizer according to claim 1, wherein a plurality of said directional couplers are concatenated.

4. An equalizer comprising a first four port directional coupler having a pair of strip lines A, C and B, D, and having the near ends A, B and the far ends C, D; a second four port directional coupler having a pair of strip lines E, G and F, H, and having the near ends E, F and the far ends G, H; a first impedance ($1/G_1$) connected between the terminal D and the ground; a second impedance ($1/G_1$) connected between the terminal E and the ground; means for connecting the terminals C and G; means for connecting the terminals B and F; a third impedance ($1/g$) connected between the terminals D and E; an input terminal connected to the port A; and the output terminal connected to the port H; wherein the following conditions are satisfied.

$$Z_{0e}^{(A)} \cdot Z_{0o}^{(A)} = R_0^2$$

$$Z_{0e}^{(B)} \cdot Z_{0o}^{(B)} = R_0^2$$

$$G_1(G_1+2g)=G_0^2$$

$$G_0=1/R_0, G_1=1/R_1, g=1/r$$

where $Z_{0e}^{(A)}$ is the even mode impedance of the first strip line, $Z_{0o}^{(A)}$ is the odd mode impedance of the first strip line, $Z_{0e}^{(B)}$ is the even mode impedance of the second strip line, $Z_{0o}^{(B)}$ is the odd mode impedance of the second strip line, $R_0$ is resistance of a power source and a load, 5. An equalizer according to claim 4, wherein said first and second strip lines are curved in a symmetrical half circle form.

* * * * *